Feb. 21, 1956　　　J. O. FORSTER　　　2,735,454
METHOD AND A DEVICE FOR MAKING WIRE COILS
Filed Sept. 18, 1953　　　　　　　　　　3 Sheets-Sheet 1

INVENTOR.
John O. Forster
BY Walter S. Hleston
ATTORNEY

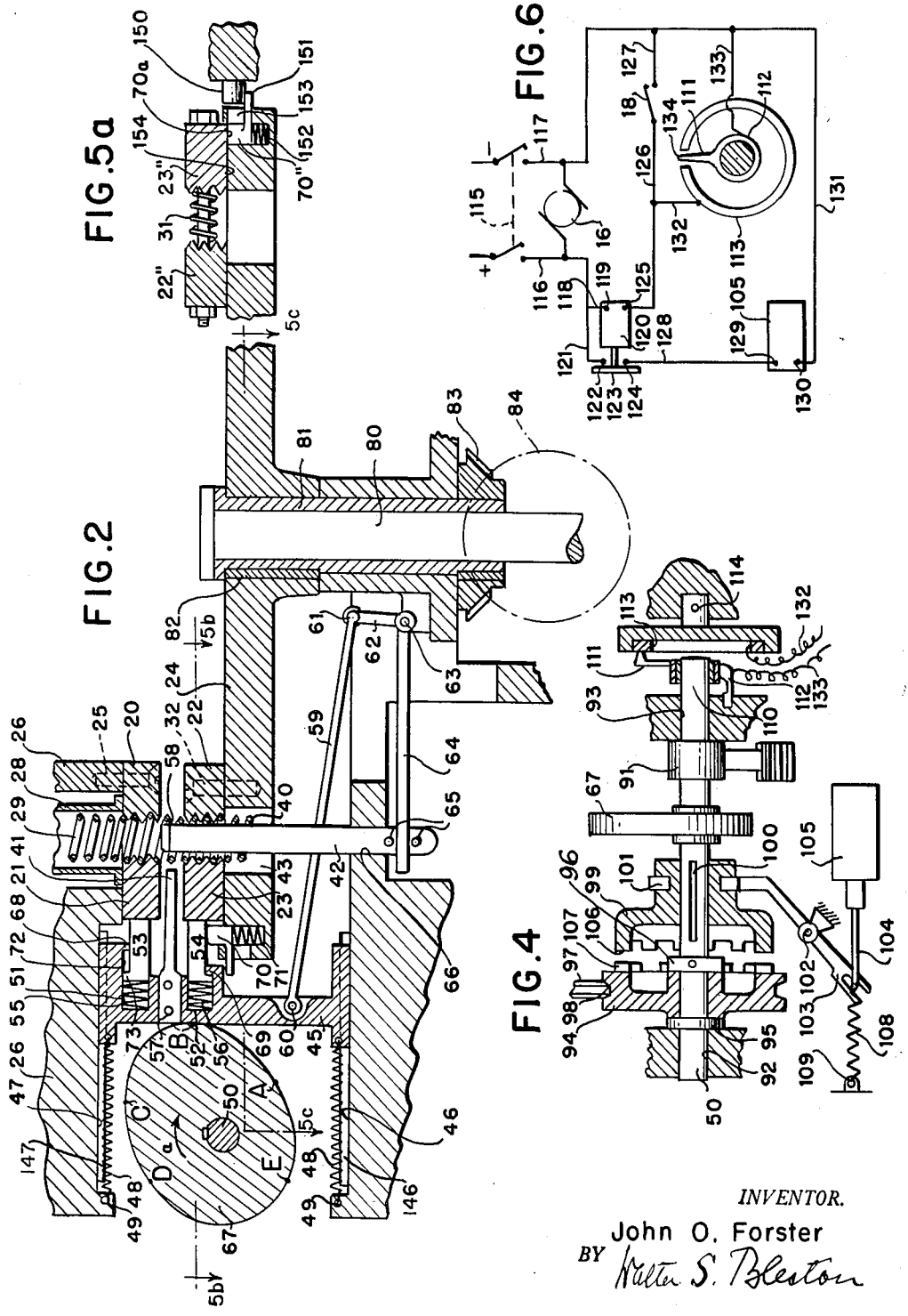

Feb. 21, 1956  J. O. FORSTER  2,735,454
METHOD AND A DEVICE FOR MAKING WIRE COILS
Filed Sept. 18, 1953  3 Sheets-Sheet 3
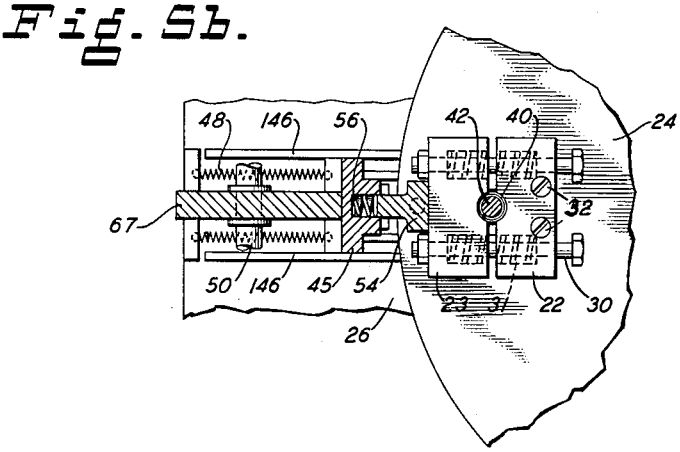
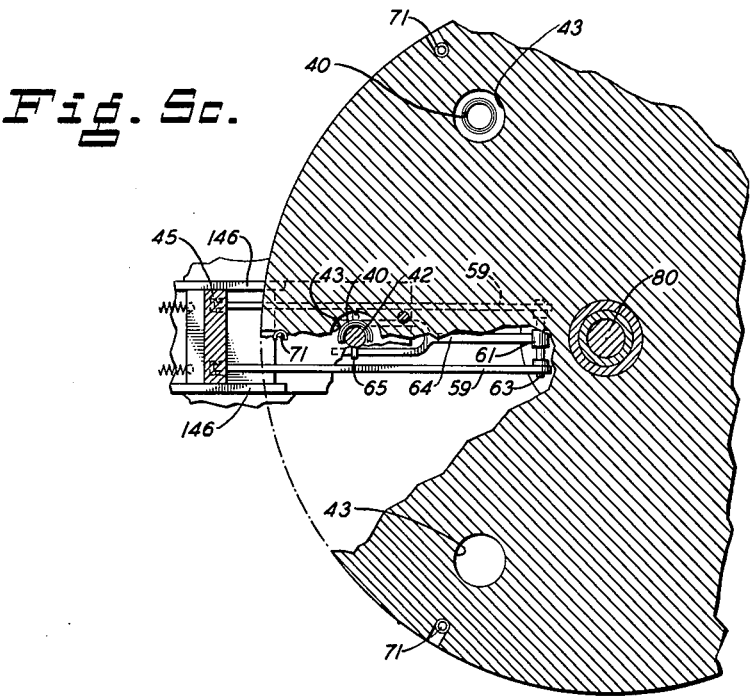
INVENTOR.
JOHN O. FORSTER
BY Walter S. Herston
ATTORNEY

United States Patent Office 2,735,454
Patented Feb. 21, 1956

2,735,454

METHOD AND A DEVICE FOR MAKING WIRE COILS

John O. Forster, Harrison, N. Y., assignor to Heli-Coil Corporation, Danbury, Conn., a corporation of Delaware Application September 18, 1953, Serial No. 381,103

12 Claims. (Cl. 140—1)

The invention relates to a method and a device for making wire coils. Wire coils which, for instance are used as thread inserts in screw connections must be accurate within narrow tolerances. Nevertheless, a high speed in the production is necessary as such thread inserts are employed in large quantities. The conventional methods and means for making such inserts are not satisfactory in that respect inasmuch as at some point of the coiling operation a stop has to occur in order to cut the advancing wire or a coiled length from the wire stock according to the desired length of each insert. This stopping and restarting of the operation is the cause of a very marked loss of time in the production. Another drawback of the conventional method is caused by the fact that the coils dropping from the coiling machine into some collecting container must be subjected to other operations. This requires that the individual coil be picked up, turned into and clamped in the correct position in which the necessary operation can be performed. This causes another undesirable loss of time.

The invention aims therefore to avoid the mentioned drawbacks and to apply a method in which the coiling of a wire advancing from a stock proceeds continuously whereas the cutting of the coils according to their desired length occurs intermittently.

Another object of the invention is to make use of the elastic deformability of a relatively large length of a continuously coiled wire in order to hold the free end portion of such length stationary for a length of time necessary to perform an operation on such end portion e. g. to cut off a coil of a predetermined length while the coiling of the advancing wire continues.

Another object of the invention is to cut a coil of a length of a continuously coiled wire between two gripped points of the coiled wire in accordance with a measured length of the wire advancing from a stock to a coiling point.

The invention further aims to coil a wire continuously, intermittently to hold and cut off an end portion of the coiled wire and to remove the cut off end portion while being held for further treatment.

The invention also aims to provide means for intermittently cutting end portions from a continuously coiled wire.

Further objects and details of the invention will be apparent from the description given hereinafter and the accompanying drawing illustrating an embodiment thereof by way of example.

In the drawing:

Fig. 1 is a diagrammatic illustration, partly in section of a device according to the invention, Fig. 2 is an illustration on a larger scale of a part of Fig. 1, Fig. 3 is a top plan view of a pair of jaws or gripping elements shown in Figs. 1 and 2, Fig. 4 is an elevation of the cam shaft with attached parts, partly in section, for actuation of the intermittently operating part of the device, Fig. 5 is a diagrammatic illustration of the drive of the turntable shown in Figs. 1 and 2, Fig. 5a illustrates the opening means for the jaws on the turntable, Figs. 5b and 5c are cross-sections along lines 5b—5b and 5c—5c, respectively, of Fig. 2.

Fig. 6 is a wiring diagram of the electrically operated parts, and

Figure 1:
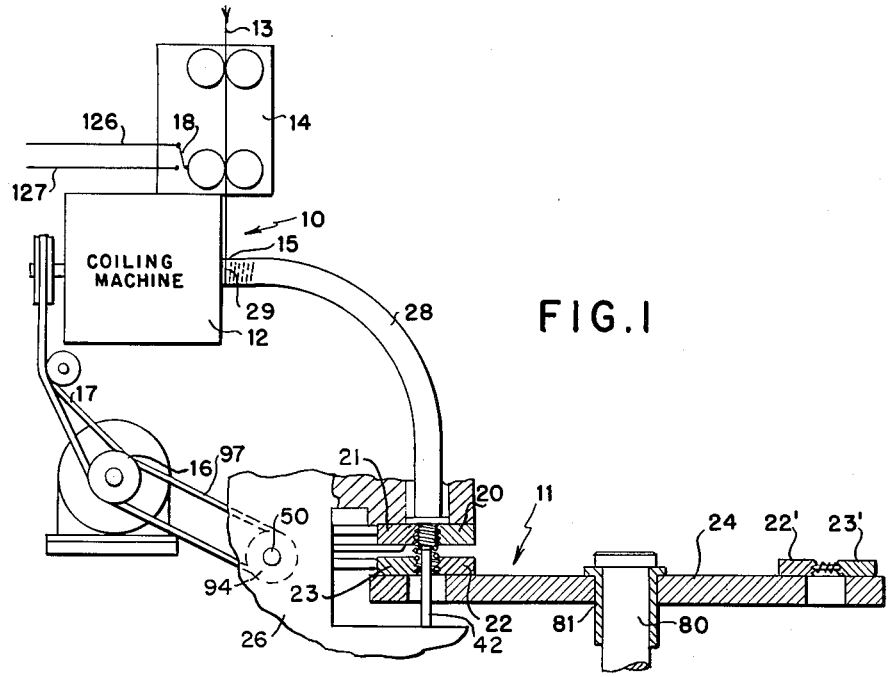

Referring now to the drawing, the illustrated device comprises two main parts, the first part 10 of which is continuously operating whereas the second part 11 operates intermittently. Part 10 comprises the continuously operating machine 12 which coils the wire 13, a length control attachment 14 through which the wire passes on its way from a stock (not shown) to the coiling point 15 of the machine 12, and a continuously running electric-motor 16 which drives the coiling machine through any suitable and conventional means illustrated by the belt 17. The length control attachment is preferably of a type which gives an electric impulse by operating a switch 18 each time an adjustable predetermined length of wire passes a set mark. Measuring or timing devices useful for the mentioned purpose may be designed on a mechanical, electrical or other principle. A device of the type here under consideration is described more in detail e. g. in my U. S. Patent 2,541,232, but there are also other apparatus on the market which may be here employed for the mentioned purpose. The measured length of the wire advancing to the coiling machine 12 is a measure for the length of a coil formed of such length of wire, wherefore the impulses given at 18 can be used for controlling the intermittent operation of part 11.

Figure 3:
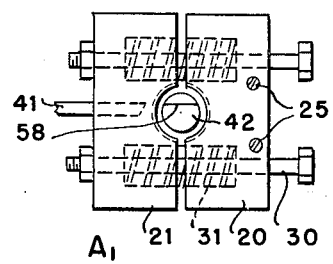

Part 11 comprises two nests or pairs of jaws 20, 21 and 22, 23. The jaws 20, 21 are provided in a fixed location whereas the jaws 22 and 23 are movable so as to be shifted in a position registering with the jaws 20 and 21 and to be removed from such position. For this reason, the jaws 22 and 23 may be provided in several sets on a suitable conveying means to be shifted from one station to another of a plurality of stations where different operations or manipulations on coils may be performed. In the illustrated embodiment the mentioned conveying means consists of a turntable 24 with e. g. six sets of nests of which in Figs. 1 and 2 the jaws 22, 23 are at a station where they register with the jaws 20, 21 whereas the pair of jaws denoted by 22', 23' are at an opposite station. The jaws 22" and 23" in Fig. 5a are at a station which a pair reaches just before it arrives at the station of Figs. 1 and 2 upon a continued turn of the turntable. As clearly shown in Fig. 2 the jaw 20 is secured by screws 25 to a stationary part 26 of the device whereas jaw 21 is movably guided as hereinafter described. A curved tube 28 is secured with its one end close to the coiling point and with its other end to the fixed jaw 20. The tube 28 serves to guide the continuously coiled or spiral wire 29 to the nest of the jaws 20 and 21 which may be internally screw threaded so as to grip a portion of the coiled wire when closed. Bolts 30 penetrating both jaws guide the one with respect to the other and springs 31 embedded in the jaws tend to spread them apart as shown in Fig. 3.

The jaws 22 and 23 are similarly constructed to the jaws 20 and 21. The jaw 22 is secured by bolts 32 to the turntable whereas jaw 23 is guided in relation to the jaw 22 by bolts similar to bolts 30 but not shown in order to prevent overcrowding of the drawing. Springs such as at 31 in Fig. 3 tend to spread or open the jaws 22 and 23. Now it will be clear that in the relative position of the nests shown in Figs. 1 and 2 the free end portion 40 of the coiled wire can advance from the tube 28 through the jaws 20, 21 and into, and even through, the jaws 22 and 23 when the nests are open. When, however, the nests or at least the upper nest, with the jaws 20, 21, are closed, the lower end portion of the coiled wire 29 is gripped and held stationary.

For better identification, in the following description and the claims the continuous coiled wire from the coiling point 15 to its free end will be called the "spiral" whereas a piece of predetermined length cut off the "spiral" will be called a "coil."

Now, in order to sever a coil of a predetermined length from the continuously coiled wire or spiral 29 a cutter 41 is provided so as to operate in the space between the jaws 20, 21 and 22, 23. The cutting blade co-operates with a mandrel 42 which can reciprocate through a hole 43 in the turntable 24 underneath the jaws 22, 23 and through an end of the spiral which may be held between these jaws.

As stated hereinbefore there are two nests or pairs of jaws between which a coil end portion can be severed. However, it is to be noted that in certain instances only the upper nest is required below which a protruding end portion of the spiral can be cut off. The lower nest arranged on the turntable and the entire turntable or conveyor device is of use only if a coil cut from the spiral is to be removed in a predetermined position for further working thereon. Otherwise the severed coil may be freely dropped into a container.

In order to actuate the intermittently operating parts a slide 45 is provided movable on guide surfaces 46 and 47 which may be provided with side rails 146 and 147, respectively. Tension springs 48 are connected to the slide and to stationary points 49 and tend to pull the slide 45 away from the turntable and towards the shaft 50 as clearly shown in Fig. 2. Two plungers 53 and 54 engage in two pockets 51 and 52 of the slide 45, and are urged outward by springs 55 and 56, respectively. The plungers 53 and 54 co-operate with the jaws 21 and 23 respectively, to close the jaws when the slide is shifted towards the right hand side in Fig. 2. Simultaneously, the cutter blade 41 secured to the slide by screws 57 will be shifted towards the right hand side so as to co-operate with a shearing edge 58 of the mandrel 42 after both pairs of jaws have been closed. In order to bring the mandrel 42 into a position for co-operation with the cutter blade 41, a push rod 59 is linked to the slide at 60 and pivoted at 61 to a bell crank lever 62. Lever 62 is pivoted at 63 and its arm 64 engages between two pins 65 at the lower end of the mandrel which is guided at 66 in the stationary part of the device.

Slide 45 can be pushed to the right hand side by a cam 67 mounted on the aforementioned shaft 50. If the point denoted by A of the cam 67 is engaged by the slide the latter will be in its left hand end position. In this position the plungers 53 and 54 will be pulled back by noses 68 and 69 of the slide so far that the jaws 21 and 23 are in their open position. Also lever arm 64 is lowered and has pulled the mandrel 42 downwards so far that it is entirely clear of the turntable 24. If the cam then turns in the direction of the arrow $a$ into the position of Fig. 2 in which the cam point B bears against the slide, the plungers 53 and 54 will have closed the open jaws 21 and 23 before the cutter blade 41 can co-operate with the now raised mandrel 42 to get the end 40 of the spiral between the grips of the upper and lower pairs of jaws. In this position the jaw 23 has passed a spring-biased latch 70 so that the latch 70 raised by its spring 71 above the top surface of the turntable 24 locks the jaw 23 in its closed position. Upon further movement of the cam until the point C bears against the slide the cutter blade 41 will be pushed to the right hand side and returned again to the position shown in Fig. 2, thereby cutting off a coil between the two pairs of jaws. While the cutter blade moves to the right for this purpose both the springs 55 and 56 of the plungers will have been compressed. In this way it is ensured that the jaws are securely closed before the cutter begins its operation.

On further movement of the cam until the point D bears against the slide, the latter will pull back plunger 54 by contact with the nose 69 whereas plunger 53 still holds the jaw 21 in closed position. This is possible inasmuch as there is sufficient clearance at 72 between the nose 68 and the co-operating abutment 73 of the plunger 53. Simultaneously the mandrel 42 will have been lowered to be entirely free of the turntable 24. Between the points D and E, the radii of the cam are of equal length so that during the time the arc DE bears against the slide no movement of the latter occurs. This period allows turning of the turntable according to the spacing between two subsequent stations by means which will be explained hereinafter. Owing to the turning, another set of jaws 22, 23 will be brought into registry with the jaws 20 and 21, and it is to be noted that the jaws 22, 23 when arriving underneath the jaws 20, 21 are in their open state meaning that the jaw 23 bears upon the top end of the latch 70 which has been pressed down by any suitable means against the restraint of its spring 71 during another turn of the turntable. Such a means is shown in Fig. 5a where the jaws have just been opened so as to drop a coil held therebetween through the hole 43 underneath the jaws. In order to open the jaws, a stationary wedge shaped member 150 is arranged in the path of a lateral projection 151 of the co-ordinate latch 70''. This projection extends laterally from the latch pocket 152 through a slot 153. When the turntable turns, the projection 151 slides under the wedge 150 and is gradually pressed down by the wedge until the top face 70a of the latch is flush with or below the top surface 154 of the turntable so that the jaw 23'' can slide over the latch face 70a due to the action of springs 31 whereby the jaws open sufficiently to release a coil. During the last part turn from E to A of cam 67 slide 45 will be pulled further to the left hand side into its end position. Owing thereto the nose 68 will engage the abutment 73 of plunger 53 to take the latter along and thereby permitting the jaw 21 to open. When then the point A again bears against the slide 45 the intermittent action is completed and cam shaft 50 will stop until a new cycle of intermittent operations will start.

Figure 5:
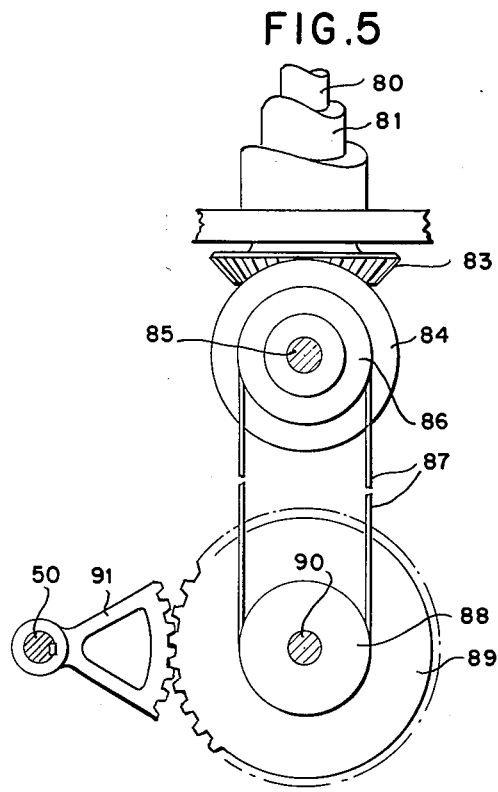

It has been stated that during a certain part of a revolution of the cam 67 the turntable 24 will be turned through an arc according to the spacing of two stations which in the present case means an arc of 60°. In order to accomplish such turning the turntable is rotatable about a stationary kingpin 80. A sleeve 81 is connected to the turntable 24 by means of a key 82. Sleeve 81 is integral with or secured to a bevel gear 83. Another bevel gear 84 meshes with the latter and is rotatable about a shaft 85 as shown in Fig. 5. A wheel 86 is coupled to wheel 84 and driven by suitable means such as a belt indicated at 87 by a wheel 88 rotatable together with a gear wheel 89 on another shaft 90. The belt 87 is shown interrupted as the location of the shaft 85 in relation to the location of the shafts 90 and 50 may be selected as desired, that means, that the shaft 50 may be e. g., on a lower level than the wheel 84 as shown in Fig. 5, or the shaft 50 may be e. g. on a higher level as shown in Figs. 1 and 2, depending on the actual shape and construction of the diagrammatically illustrated machine and its parts. On the cam shaft 50 a toothed, 60 degrees sector 91 is secured which can mesh with gear wheel 89 when the cam shaft 50 rotates. If the radii of the sector 91 and wheel 89 are of equal length and similarly the radii of the wheels 86 and 88 and of the wheels 83 and 84 then one revolution of the cam shaft 50 will cause a 60° turn of the turntable. The sector 91 is so angularly secured to the shaft 50 that it engages the gear wheel 89 while the cam contacts the slide between points D and E. Consequently the turning of the turntable will occur in proper relation to the movement of the other intermittently operating parts. Of course other suitable and conventional means than those illustrated and described may be used to drive the turntable as may be required or desired.

The arrangement of the cam shaft 50 and its associated parts is clearly shown in Fig. 4. The cam shaft 50 is journaled in bearings 92 and 93 in the stationary part of the machine. Cam 67 and toothed sector 91 are keyed to shaft 50 in an angular relationship as hereinbefore explained. A first part 94 of a dog clutch is freely rotatable on shaft 50 between two collars 95 and 96, and continuously driven by motor 16 (see Fig. 1) through suitable means shown as a wedge belt 97 engaging in a V-shaped peripheral groove 98 of the part 94. The cooperating second clutch part 99 is splined to shaft 50 at 100 and can be reciprocated in the axial direction by a fork 101 which is pivoted to a stationary part at 102. The free arm 103 of the fork engages the armature rod 104 of a solenoid 105. Upon energization of the solenoid the fork will shift the clutch part 99 so as to cause the engagement of the dogs or teeth 106 of clutch part 99 with the dogs or teeth 107 of clutch part 94. When the solenoid 105 is de-energized a tension spring 108 between the armature 104 and a fixed point 109 of the stationary structure will cause the disengagement of the clutch. At its free end 110 opposite the clutch, cam shaft 50 carries a contact arm 111 electrically insulated with respect to the shaft, and a current-conducting brush 112 bears against the hub of arm 111. This arm co-operates with an arcuate contact 113 fixedly secured to a stationary part as indicated at 114. The members 110 to 113 are parts of the timing circuit for starting and stopping the intermittently movable parts.

The timing circuit is illustrated in Fig. 6. A main switch 115 supplies current from an electric source to the bus bars 116 and 117 between which the motor 16 is connected. Bus bar 116 is further connected through line 118 to one terminal 119 of a relay 120 and through a line 121 to a contact 122 which can be engaged by the armature 123 and connected to another contact 124 when the relay is energized. The other terminal 125 of the relay 120 is connected through a line 126 to the timing switch 18 mentioned in the description of Fig. 1 and which in turn is connected to bus bar 117 through a line 127. A wire 128 connects contact point 124 to the first terminal 129 of the solenoid 105 shown in Fig. 4, the other terminal 130 of which is connected to the bus bar 117 through a line 131. The aforementioned contact arc 113 which extends through only little less than 360° is connected through a line 132 between the relay terminal 125 and switch 18, and the contact brush 112 is connected through line 133 to the bus bar 117.

The device operates in the following manner: When the main switch 115 is thrown in, motor 16 receives current so as to drive continuously the coiling machine and also the freely rotating part 94 of the dog clutch on cam shaft 50. A continuous spiral is formed at the coiling point 15 and guided within tube 28 towards the nest 20, 21. The wire 13 advances from the stock to the coiling machine through the length control attachment 14. When a predetermined length of wire has passed, switch 18 is momentarily closed. In consequence, current can flow from bus bar 116 through line 118, relay 120, line 126, switch 18, and line 127 to the bus bar 117. Thereby the relay 120 will be energized and its armature 123 will bridge the contacts 122 and 124 so that current will flow from 116, through line 121, points 122, 124, line 128, solenoid 105, and line 131 to bus bar 117. In consequence, the solenoid 105 will attract its armature 104 and thereby cause the engagement of clutch part 99 with part 94 through the fork 101. Cam shaft 50 will start to rotate and with it contact arm 111 which immediately leaves the insulated spot 134 of the contact arc 113. Although now switch 18 having given the starting impulse may open again, relay 120 stays energized as current can flow from 116, through line 118 to terminal 119 of the relay 120 and further from the terminal 125, through lines 126, 132, contact arc 113, arm 111, brush 112 and line 133 to the bus bar 117. Thus the solenoid 105 holds the clutch 94, 99 engaged until one revolution of the cam shaft 50 has been completed and arm 111 reaches the insulated spot 134 so as to interrupt the current through the relay 120. The de-energization of the relay opens the solenoid circuit with the result that spring 108 will disengage the clutch part 99 from part 94 and the rotation of the cam shaft stops. This stopping of the cam shaft has clearly no effect on the motor 16 which will continue to drive the coiling machine. The cycle of operation of the intermittently operative parts will start again when another predetermined length of wire has passed the length control and another current impulse is given through the switch 18. During the period between each stopping and starting of the cam shaft movement, both the nests 20, 21 and 22, 23 in registry therewith are open, so that the spiral portion which was gripped in the nest 20, 21 can progress into and, depending on the desired length of each individual coil, even partly or entirely through the nest 22, 23 until a new start of operation of the intermittently operative parts causes the nest to close and to grip the spiral portion in the jaws 20, 21 and 22, 23.

Figure 7:
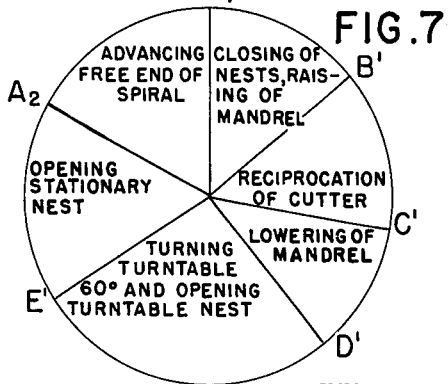
Fig. 7 is a diagram of the cycle of operations.

Fig. 7 is a diagram of a complete cycle of operation. The points denoted by B′, C′, D′, E′ correspond to the points B, C, D, E of the cam 67 in Fig. 2, whereas points $A_1$ and $A_2$ correspond to the point A at the beginning and at the end, respectively, of a cam revolution. The whole circle of 360° corresponds to the period between two subsequent impulses given by the switch 18 or in other words to the time required for winding a coil of a predetermined length. The complete cycle comprises the following six periods, during which the coiling operation never stops:

$A_1$—B′: closing of the gripping nests, raising of mandrel
B′—C′: reciprocation of cutter,
C′—D′: lowering of mandrel,
D′—E′: turning of turntable,
E′—$A_2$: opening of the stationary gripping nest,
$A_2$—$A_1$: advancing of end of spiral.

The operativeness of the method and device hereinbefore described largely depends on the proper length of the tube 28, i. e. the minimum distance the continuous spiral is guided from the coiling point 15 to the first gripping point or nest 20, 21. This distance must be selected according to the elastic properties of the spiral and other factors among which is predominantly the number of convolutions coiled during one cycle of the intermittent operations, i. e. during each period the end of the spiral is gripped. It is of course possible to calculate the required minimum length of the tube. However it is much simpler to find the suitable length by trial. In selecting the tube length it is to be considered that if a continuous spiral is produced, such spiral turns about its own axis while its end is free. If, however, the end is so held that it cannot turn, then, the length of the spiral between the coiling point and the gripping point will be twisted according to the number of convolutions formed during the time the free end is gripped. This twist will cause an expansion of the convolutions. Now in order to ensure that the coils turn out according to the desired shape, it is imperative that the expansion does not cause a permanent deformation but that the deformation is well within the elastic limits of the wire material. This requires that each convolution will not be expanded more than a little wherefore the tube 28 must have an inner diameter at least slightly larger than the outer spiral diameter, and it must be sufficiently long to accommodate a relative large number of convolutions between the coiling point and the gripping point. On the other hand the tube 28 must not be too long for the following reason. If the tube exceeds a certain length, the forces driving the end of the continuous spiral into the next open nest are materially reduced owing to the flexibility of the spiral. Then it may happen that the friction encountered in driving the spiral convolutions through the open nest will cause the spiral, owing to its excessive length, to wind itself up enough to delay its entrance into such nest. This in turn will lead to an additional movement of the spiral back and forth which will over-ride the basic drive of the coiling machine and will cause the free end of the continuous spiral to over-shoot the desired length of the coil in the nests of the turntable at the time of cut-off. At the same time the over-shooting of the spiral will have a tendency to stretch the remaining part causing a negative force, which will try to contract and shorten the continuous spiral so that excessive length of the tube between coiling point and gripping point will produce a swinging action of the free end of the continuous spiral which in turn will cause the coil lengths to vary to a much greater extent than permitted by tolerances of length of coils intended to be used e. g. as screw thread inserts. If the spiral is wound with spaced convolutions it is generally easier to accommodate the length coiled during a period the end of the spiral is gripped than if the spiral is wound from the start with each convolution closely contacting the adjacent ones. It may even be advisable in the last mentioned event to lubricate the convolutions within the guide tube as owing to the occurring expansion the convolutions will shift in relation to one another. However, if the length of the guiding tube or the distance between the coiling point and the gripping point is properly selected no difficulty will be encountered in the application of the method and the device of the invention.

Thus a method and a device have been described whereby a wire can be continuously coiled while intermittently an end portion of the so produced spiral is gripped, held stationary, cut off and carried away in a predetermined position for further operations thereon.

It will be apparent to those skilled in the art, that many alterations and modifications of the method hereinbefore described and of the illustrated structure are possible without departure from the spirit and essence of the invention which for that reason shall not be limited but by the scope of the appended claims.

I claim:

1. A method of making wire coils of a predetermined length which comprises the steps of continuously coiling, at a coiling point, a wire advancing from a stock, so as to form a continuous spiral, guiding the spiral with its leading end to a stationary gripping point spaced from said coiling point a distance of at least several times said predetermined length while confining the spiral throughout said whole distance so as to keep the length of said spiral constant between said coiling point and said gripping point, gripping said spiral at said gripping point when a leading end portion projects beyond said gripping point a distance according to said predetermined length, holding the gripped spiral portion temporarily stationary thereby causing the wire portion coiled during the gripping period elastically to increase the diameter of the confined spiral portion, severing said leading end portion from said gripped spiral close to said gripping point, and releasing the grip on said spiral thereby causing said spiral to advance beyond said gripping point owing to a decrease of the precedingly increased spiral diameter and to the continued coiling.

2. A method of making wire coils of a predetermined length which comprises the steps of continuously coiling at a coiling point, a wire advancing from a stock so as to form a continuous spiral, guiding said spiral between said coiling point and a gripping point spaced from said coiling point a distance of at least several times said predetermined length while confining the spiral throughout said whole distance so as to keep the length of said spiral constant between said coiling point and said gripping point, intermittently gripping said spiral at said gripping point, holding the gripped spiral portion temporarily stationary thereby causing the wire portion coiled during the gripping period elastically to increase the diameter of the confined spiral portion, and severing a portion of said spiral projecting beyond said gripping point, each time the length of said projecting portion substantially equals said predetermined length, and releasing said grip when a portion has been severed thereby causing said spiral to advance beyond said gripping point owing to a decrease of the precedingly increased spiral diameter and to the continued coiling.

3. A method as claimed in claim 2, the distance said spiral is guided confined between said coiling point and said gripping point being of a length sufficient to allow for an elastic deformation of the convolutions of said spiral owing to the continued coiling during the period the spiral is gripped at said gripping point.

4. A method as claimed in claim 2, further comprising the steps of continuously measuring at a measuring point the wire advancing from said stock to said coiling point, and causing said spiral to be gripped, and a spiral portion to be severed from the remainder of said spiral each time a length of wire according to the length of wire in a coil of said predetermined length, passes said measuring point.

5. A method as claimed in claim 2 further comprising the steps of exercising, simultaneously with said first mentioned grip, a second grip on an end portion of said spiral projecting beyond said first grip, performing said severing of said spiral between said first and said second grip, and removing said end portion while being held in said second grip for further operation thereon, before releasing said first grip.

6. A method of making wire coils of a predetermined length which comprises the steps of continuously coiling at a coiling point a uniformly advancing wire stock; at equal intervals, gripping the so coiled spiral at a stationary gripping point remote from said coiling point so as to prevent axial and rotational movement of the spiral at said gripping point and to cause a deformation within the elastic limits of the convolutions of the spiral between said coiling point and said gripping point owing to the continued coiling during the time the spiral is gripped while preventing an increase of the length of said spiral between said coiling point and said gripping point, severing an end portion of said spiral projecting beyond said gripping point, and releasing said grip thereby to restore said convolutions of said spiral to their undeformed shape and to cause another end portion of said spiral to project beyond said gripping point.

7. A device for producing wire coils of predetermined length, comprising a continuously operating wire coiling machine, a releasable gripping means in a stationary location remote from said coiling machine for temporarily engaging and holding immovable a portion of the continuous spiral wound by said coiling machine, a guiding and confining means for said spiral extending from said machine to said gripping means, a cutter close to said gripping means and in the path of said spiral beyond said gripping means, an impulse transmitter intermittently operative in equal intervals, and impulse responsive means to operate said gripping means and said cutter and to release said gripping means after the completion of the cutting operation.

8. A device for producing wire coils of predetermined length, comprising a first continuously operating part and a second, intermittently operative part, said first part including a machine continuously coiling a wire uniformly advancing from a stock, and a measuring and impulse giving attachment between said machine and said stock for giving an impulse each time said attachment has measured a predetermined length of said advancing wire; said second part including a pair of releasable jaws adapted to grip a portion of the spiral coiled by said machine and a cutter close to said jaws for severing an end portion of said spiral; a means responsive to said impulses and cyclically actuating said jaws and said cutter of said second part; and a guiding and confining conduit for said spiral extending from said first to said second part, said conduit being of such a cross-section and length as to take up deformations of the convolutions of said spiral caused by the coiling of wire during a cycle of operation of said second part.

9. A device for producing wire coils of predetermined length, comprising a continuously operating wire coiling machine, a first pair of releasable jaws in a stationary location remote from said coiling machine for temporarily engaging and holding immovable a portion of the continuous spiral coiled by said machine, a guiding and confining conduit endwise connected to said machine and said first pair of jaws, a second pair of jaws having a position in continuation of but slightly spaced from said first pair of jaws on the side of the latter opposite said conduit, a cutter operative on said spiral between said pairs of jaws, an impulse transmitter intermittently operative in equal intervals, and impulse responsive means for cyclically closing said pairs of jaws, operating said cutter and opening said pairs of jaws, said conduit being of such a cross-section and length as to take up deformations of the convolutions of said spiral caused by the continued coiling of the wire during a cycle of operation of said impulse responsive means.

10. A device for producing wire coils which comprises a continuously operating wire coiling machine, a length control attachment connected to said machine in the path of said wire advancing from a stock to said machine and including means for giving an impulse each time the end of a predetermined length of wire has passed said means, a first pair of releasable jaws in a stationary location remote from said coiling machine for temporarily engaging and holding immovable a portion of the continuous spiral coiled by said machine, a guiding and confining tubular conduit for said spiral endwise connected to said machine and said first pair of jaws, a plurality of pairs of second releasable jaws, a conveyor on which said pairs of second jaws are mounted and which is movable in a path so as to shift each pair of second jaws from a first into a second position while shifting another one of said pair of second jaws from said second in said first position, each of said pair of second jaws when in said first position being located in registering continuation of but slightly spaced from said first pair of jaws on the side of the latter opposite said tubular conduit, a cutter operative on said spiral in the said space between said pair of first jaws and a pair of said second jaws in said first position, a device intermittently operative in cycles and including a first means to close said pair of first jaws and said pair of second jaws which is in registry with said pair of first jaws, a second means to operate said cutter, and a third means to move said conveyor one step equal to the spacing of two adjacent pairs of second jaws, means in co-operation with said conveyor to open each pair of second jaws arriving in said second position, and a means responsive to said impulses to start said intermittently operating device and to stop it at the end of each cycle wherein the interval between two subsequent impulses is larger than the duration of one of said cycles, said conduit being of such a cross-section and length as to take up deformations of the convolutions of said spiral caused by the continued coiling of the wire during one of said cycles.

11. A device as claimed in claim 10, said conveyor being a turntable on which said pairs of second jaws are mounted, each pair of jaws including springs tending to open said jaws, a locking means co-ordinate with each pair of second jaws to hold said pair of jaws locked when it has been closed, and a releasing means engaging the locking means of each pair of second jaws which upon the stepwise turning of said conveyor reaches said second position so as to withdraw said locking means from its locking position and to cause the opening of said pair of second jaws.

12. A device for producing wire coils of a predetermined length, comprising a continuously operating wire coiling machine producing a spiral from a wire stock, a pair of jaws in a location remote from the point where said spiral forms and in the path of said spiral, and stationary with respect to said coiling machine, said jaws being adapted to clamp and hold a portion of said spiral temporarily immovable, a spring connected to said jaws and tending to hold said jaws in an open position, a cutter close to said jaws and adapted to sever from said spiral an end portion projecting from said jaws, a cyclically operative drive to close temporarily said jaws against the restraint of said spring and to operate said cutter each time a spiral portion according to said predetermined length projects from said jaws, and a tubular conduit extending from said point where said spiral forms to said jaws, said conduit having an inner diameter somewhat larger than the outer diameter of said spiral when in a free state, and having a length several times said predetermined length.

References Cited in the file of this patent

UNITED STATES PATENTS

| Number | Name | Date |
|---|---|---|
| 469,943 | Jeffrey | Mar. 1, 1892 |
| 805,724 | Harter | Nov. 28, 1905 |
| 1,065,336 | Bigelow | June 24, 1913 |
| 1,083,223 | Sleeper | Dec. 30, 1913 |
| 1,309,011 | Bourque | July 8, 1919 |
| 1,498,394 | Mahoney | June 17, 1924 |
| 1,873,626 | Nigro | Aug. 23, 1932 |
| 2,062,552 | Burgess | Dec. 1, 1936 |
| 2,227,442 | De Millar | Jan. 7, 1941 |
| 2,260,053 | Platt | Oct. 21, 1941 |
| 2,262,994 | Dickey | Nov. 18, 1941 |
| 2,296,878 | Saval | Sept. 29, 1942 |
| 2,390,283 | Wilkins | Dec. 4, 1945 |
| 2,541,232 | Forster | Feb. 13, 1951 |
| 2,543,370 | Kludt | Feb. 27, 1951 |
| 2,568,775 | Stull | Sept. 25, 1951 |
| 2,595,747 | Andersen | May 6, 1952 |
| 2,630,145 | Stevens | Mar. 3, 1953 |

FOREIGN PATENTS

| Number | Country | Date |
|---|---|---|
| 10,578 | Great Britain | May 9, 1903 |